US005949351A

United States Patent [19]

Hahm

[11] Patent Number: 5,949,351
[45] Date of Patent: Sep. 7, 1999

[54] SYSTEM AND METHOD FOR BI-DIRECTIONAL TRANSMISSION OF INFORMATION BETWEEN A REMOTE CONTROLLER AND TARGET SYSTEMS

[75] Inventor: Jin-Ho Hahm, Daejeon, Rep. of Korea

[73] Assignee: Electronics and Telecommunications Research Institute, Daejeon, Rep. of Korea

[21] Appl. No.: 08/742,674

[22] Filed: Nov. 4, 1996

[30] Foreign Application Priority Data

Dec. 20, 1995 [KR] Rep. of Korea ...................... 95-52639

[51] Int. Cl.[6] ...................................................... H04Q 1/00

[52] U.S. Cl. ................................ 340/825.72; 340/825.25; 348/734; 341/176; 345/169

[58] Field of Search ......................... 340/825.69, 825.72, 340/825.25; 348/734; 341/176; 345/169, 158

[56] References Cited

U.S. PATENT DOCUMENTS

| | | | |
|---|---|---|---|
| 4,746,919 | 5/1988 | Reitmeier | 340/825.72 |
| 4,796,019 | 1/1989 | Auerbach | 345/169 |
| 4,825,209 | 4/1989 | Sasaki et al. | 348/734 |
| 4,855,730 | 8/1989 | Venners et al. | 340/825.25 |
| 4,959,721 | 9/1990 | Micic et al. | 340/825.69 |
| 4,965,557 | 10/1990 | Schepers et al. | 345/169 |
| 5,128,668 | 7/1992 | Ikesaki et al. | 340/825.72 |
| 5,237,327 | 8/1993 | Saitoh et al. | 341/176 |
| 5,410,326 | 4/1995 | Goldstein | 340/825.72 |
| 5,418,527 | 5/1995 | Yashiro | 340/825.72 |
| 5,537,107 | 7/1996 | Funado | 341/176 |
| 5,565,855 | 10/1996 | Knibbe | 340/825.69 |

*Primary Examiner*—Brian Zimmerman
*Attorney, Agent, or Firm*—Antonelli, Terry, Stout & Kraus, LLP

[57] ABSTRACT

The remote control method and system therefor, for integrating and controlling plural controlled apparatuses by using a single controlling apparatus are disclosed. In the remote control system a display is set, and in the controlling apparatus and in several controlled apparatuses light emitting parts and light receiving parts are set so as to be enabled to communicate in both directions in a wireless style communication. According to a request of the controlling apparatus, a menu is displayed on a display of the controlling apparatus in a character or a graphic type on the basis of a packet data for a control function transmitted from the controlled apparatuses, so that a user may select it. Thereby, the user operates a direction key button and operational buttons, which adhere to the controlling apparatus, and also the user selects the wanted control function out of the displayed menu, and makes it transmitted to the controlled apparatuses in the wireless style communication. Accordingly several controlled apparatuses are easily integrated and controlled by one remote control system.

9 Claims, 6 Drawing Sheets

SYSTEM AND METHOD FOR BI-DIRECTIONAL TRANSMISSION OF INFORMATION BETWEEN A REMOTE CONTROLLER AND TARGET SYSTEMS

BACKGROUND OF THE INVENTION

The present invention relates to a remote control method and a system therefor, integrating and controlling plural controlled apparatuses, and more particularly to the remote control method and the system therefor, for integrating and controlling, by using a single controlling apparatus, the controlled apparatuses of the plural numbers, by communicating in both directions a control data in a wireless style communication between a controlling apparatus and the controlled apparatus in order to control the controlled apparatuses of the plural numbers existing in a remoteness.

It has been well-known the remote controlling system for controlling the controlled apparatus by transferring the control data to the controlled apparatus existing in the remoteness by using an infrared rays or a radio wave. As showing in an example of a television (TV) or an audio system, the remote controlling apparatus is designed and manufactured as a pair in a system development stage on the basis of a performing function existing in a system to be controlled by the remote controlling apparatus. But in case a user wants to use several of controlled system, he should use selectively with several remote controlling apparatuses. This is very inconvenient thing for the user and in case of a selection of a specific controlling apparatus for controlling a specific controlled apparatus there are many confused things. Also since a keeping and a using for numerous controlling apparatuses are complicated, an attempt for a development of an integrated control system for controlling numerous controlled apparatuses with one controlling apparatus has been progressed.

As such effort's result, in these days the remote controlling apparatus capable of programming by the user according to the controlled apparatus is developed, thereby users can control by using it numerous controlled apparatuses by one controlling apparatus. However, in this case since the user wanting to use the integrated remote controlling apparatus must do the programming working one by one in the controlling apparatus matching to a function of the controlled apparatus, there are the complication and the problem the other users have the inconvenience in its using in case the programming contents are not recorded in a corresponding button of the remote controlling apparatus.

SUMMARY OF THE INVENTION

It is therefore, an object of the present invention for solving the problem of the above-mentioned conventional art to provide a remote control method and a system therefor, for controlling controlled apparatuses of plural numbers by using a single controlling apparatus, by communicating in both directions a control data in a wireless style communication between the controlling apparatus and the controlled apparatus.

In the remote control method for integrating and controlling the controlled apparatuses of plural numbers by using the single controlling apparatus, by communicating in both directions the control data in the wireless style communication between the controlling apparatus and the controlled apparatus, the remote control method of the present invention for achieving the above object includes: a first step for transmitting a controlled apparatus register request packet to the controlled apparatus in order to confirm a presence of the controlled apparatus; a second step which the controlled apparatuses receive the controlled apparatus register request packet and transmit themselves apparatuses information with a controlled apparatus register response packet to the controlling apparatus; a third step for transmitting a controlled apparatus additional register request packet to the controlled apparatus through the controlling apparatus so that the controlled apparatuses may be registered again; a fourth step for displaying as a menu list the controlled apparatus which the controlling apparatus is confirmed, and for transmitting a menu request packet from the controlling apparatus to the controlled apparatus decided in the above step when the controlled apparatus the user wants is selected; a fifth step for comparing and confirming whether an identification code (hereinafter, referred to as "ID") of the controlled apparatus of a received packet is same as itself ID or not, in case that the plural controlled apparatuses receive the menu request packet transmitted from the controlling apparatus in the fourth step, and for disregarding the reception packet in case it is not same and transmitting the menu response packet for displaying a selective menu in the present state to the controlling apparatus in case it is same as; a sixth step for comparing with the controlled code ID and judging whether a received menu response packet is the data from the controlled apparatus it oneself requests when the controlling apparatus receives the menu response packet in the fifth step, for disregarding the received packet if it is the data from the other controlled apparatus, for processing this packet and displaying the menu selective by the user if the received packet is the packet from the controlled apparatus it oneself requests the menu, and for transmitting an execution request packet to the controlled apparatus when the user requests the menu; and a seventh step for confirming the controlling apparatus ID and the controlled apparatus ID and judging whether it is the suitable data transmitted to it oneself when the controlled apparatus receives the execution request packet of the sixth step, for disregarding it in case it is not the object for it oneself, for changing a state of the controlled system in a controlled part in case it is the data it oneself will receive, and for transmitting the execution response packet for informing that it oneself receives the data and finishes the process, to the controlling apparatus.

Also, in the remote control system for integrating and controlling the controlled apparatuses of plural numbers by using the single controlling apparatus, by communicating in both directions the control data in the wireless style communication between the controlling apparatus and the controlled apparatus, the remote control system being according to an aspect of the present invention, the controlling apparatus includes: a processor for controlling function of whole constructed elements; a key pad for accepting a user's command; a key pad controller for receiving an input of the key pad and transmitting it to the processor; a display for displaying the menu so that the user can confirm; a frame buffer having a screen data to be displayed on the display; a display controller for reading the data of the frame buffer and displaying it on the display; a transmitter for transmitting a control data to the controlled apparatus; a transmitting buffer for keeping the data to be transmitted through the transmitter; a receiver for receiving the data from the controlled apparatus; a receiving buffer for keeping the data received through the receiver; and a memory for storing a state of the controlling apparatus and an administration data.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

Figure 1:
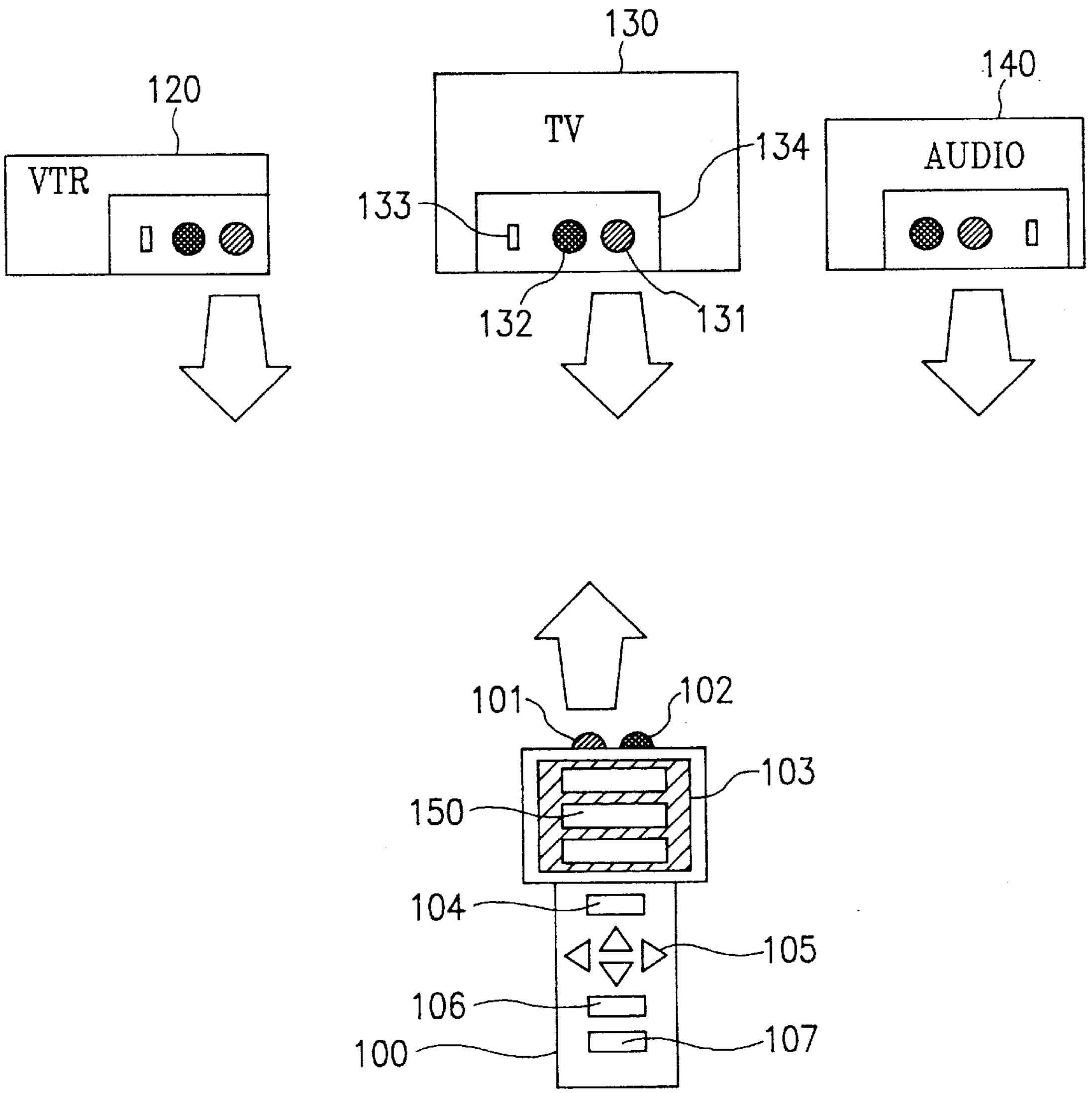
FIG. 1 is a correlating diagram between plural controlled apparatuses and a remote control system applied to the present invention.

In the following description, numerous specific details are set forth to provide a more thorough understanding of the present invention. It will be apparent, however, to one skilled in the art, that the present invention may be practiced without these specific details. In other instances well known apparatuses have not been described so as not to obscure the present invention.

Preferred embodiment for a remote control method and a system therefor, of the present invention is illustrated in detail referring to the drawings, as follow.

FIG. 1 is a correlating diagram between plural controlled apparatuses and a controlling apparatus the present invention is applied to. As showing in FIG. 1, in the present invention, in the remote control system 100 a display 103 is set, and in the controlling apparatus 100 and in several controlled apparatuses 120, 130 and 140 light emitting parts 101 and 131 and light receiving parts 102 and 132 are set so as to be enabled to communicate in both directions in a wireless style communication. According to a request of the controlling apparatus 100, a menu 150 is displayed on a display 103 of the controlling apparatus 100 in a character or a graphic type on the basis of a packet data for a control function transmitted from the controlled apparatuses 120, 130 and 140, so that a user may select it. Thereby, the user operates a direction key button 105 and operational buttons 104, 106 and 107, which adhere to the controlling apparatus 100, and also the user selects the wanted control function out of the menu 150 displayed, and makes it transmitted to the controlled apparatuses 120, 130 and 140 in the wireless style communication. Accordingly several controlled apparatuses 120, 130 and 140 are easily controlled by one remote control system 100. The user presses a device button 104 of the controlling apparatus 100 in a first step. Then, the controlling apparatus 100 transmits a packet 210 shown in FIG. 2 to the controlled apparatus 120, 130 and 140 in order to confirm what kind of controlled apparatuses there are.

Figure 2:
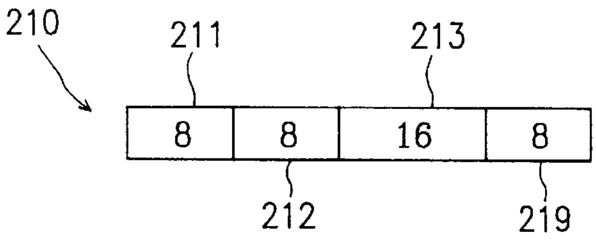
FIG. 2 is a view showing a controlled apparatus register request packet transmitted to a controlled apparatus from a controlling apparatus according to the present invention.

FIG. 2 is a view showing a 'controlled apparatus register request packet' transmitted to the controlled apparatus from the controlling apparatus according to the present invention. As showing in FIG. 2, the 'register request packet' 210 is constructed by a command code 211 meaning the packet's nature, a packet length 212, an identification code 213 (hereinafter, referred to as "ID") of the controlling apparatus 100 and an error detecting code 219 of a transmission data. After that, when the controlled apparatuses 120, 130 and 140 receive this packet 210, a light emitting diode (LED) 133 adhering to the controlled apparatuses 120, 130 and 140 flickers to inform that it oneself is receiving, to the user visually, and transmits oneself apparatus information to the controlling apparatus 100 to respond about oneself presence. At this time a transmitted packet 220 is shown in FIG. 3.

Figure 3:
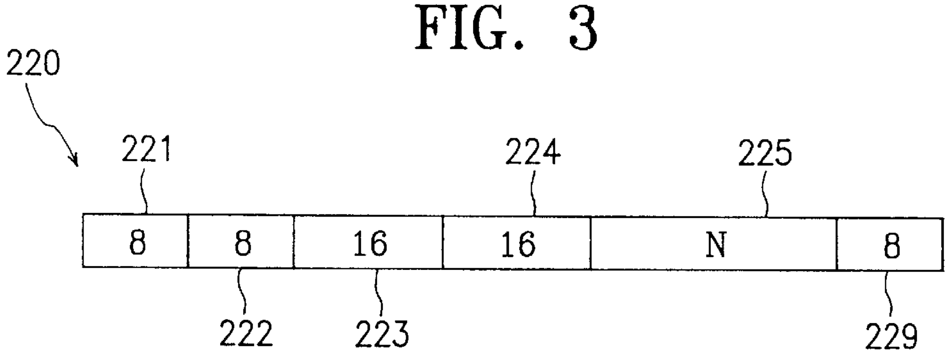
FIG. 3 is a view showing a controlled apparatus register response packet transmitted to the controlling apparatus from the controlled apparatus according to the present invention.

FIG. 3 is a view showing a controlled apparatus register response packet transmitted to the controlling apparatus from the controlled apparatus according to the present invention. As showing in FIG. 3, the register response packet 220 is constructed by a response code 221 meaning the packet's nature, a packet length 222, an ID 223 of the controlling apparatus 100, which must receive a response, an ID 224 of the controlled apparatuses 120, 130 or 140, a name 225 of the controlled apparatus and an error detecting code 229. Such a bi-directional communication is performed by an infrared rays between the light emitting parts 101 and 131 and the light receiving parts 102 and 132, which are set in the controlling apparatus 100 and the controlled apparatuses 120, 130 and 140, and in order to get more wider angle and longer range, a radio wave can be used.

Since such communication steps are many to one communication, there is a some possibility that the response data from the plural controlled apparatuses 120, 130 and 140 collide with one another. Therefore, the respective controlled apparatuses 120, 130 and 140 wait for a random time, and then transmit the response data. Generally since there is a research result that without feeling about being delayed the time the user can endure and wait for the response is 300 millisecond at maximum after the command, the respective controlled apparatuses 120, 130 and 140 wait for within this time in a random and then transmit the response data to the controlling apparatus 100. However, if the controlled apparatus 120, 130 and 140 don't receive the packet 210 shown in FIG. 2, if the controlling apparatus 100 doesn't receive the packet 220 shown in FIG. 3 from the controlled apparatuses 120, 130 and 140, or if the user again presses the device button 104 in order to solve a failure since there is the failure probability in the register of the controlled apparatus owing to a collision of the response packets of FIG. 3, the controlling apparatus 100 transmits a packet 230 shown in FIG. 4.

Figure 4:
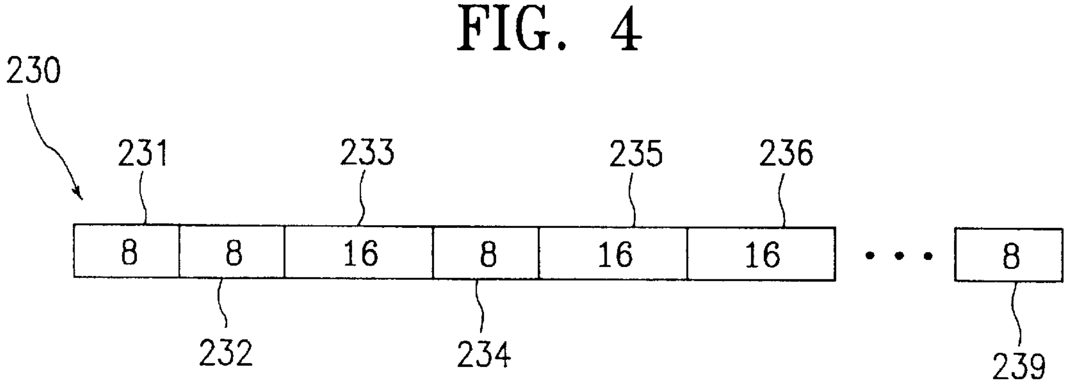
FIG. 4 is a view showing a controlled apparatus additional register request packet transmitted to the controlled apparatus from the controlling apparatus according to the present invention.

FIG. 4 is a view showing a controlled apparatus additional register request packet transmitted to the controlled apparatus from the controlling apparatus according to the present invention. Though this packet 230 is similar to the packet 210 of FIG. 2, the packet 230 informs the controlled apparatus the ID of the controlled apparatus which is not necessary for receiving again the response as it is already confirmed, and thereby the corresponding controlled apparatus doesn't respond. As showing in FIG. 4, the re-register request packet 230 is constructed by a command code 231 meaning the packet's nature, a packet length 232, an ID 233 of the controlling apparatus 100, an exempted controlled apparatus number 234, a successive exempted controlled apparatus ID 235 and 236, and an error detecting code 239.

Figure 5:
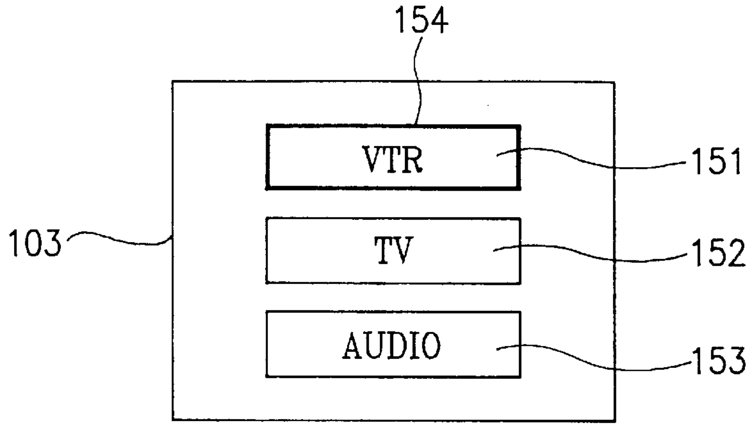
FIG. 5 is a view showing a menu for a control object apparatus displayed on a display of the controlling apparatus according to the present invention.

FIG. 5 is a view showing a menu list for a control object apparatus displayed on the display 103 of the controlling apparatus 100 according to the present invention. The controlling apparatus 100 displays the control object confirmed as the controlled apparatus through the above steps on the display 103 as a control object list. In the example shown in FIG. 5, menus 151, 152 and 153 for the controlled object 120, 130 and 140 of three kinds of VTR, TV and an audio, which are responded presently, are indicated as boxes of graphic type and characters, and a first control object selected as a default is indicated as an emphasized type, surrounded by a cursor 154. In case the apparatus the user wants to control is different from the selected apparatus displayed presently on the display, he moves the cursor 154 to a wanting controlled object by using the direction key button 105 of the controlling apparatus 100, and then presses the menu button 106. Passing through the above steps, the wanting controlled object is decided by the user, and when the menu button is pressed, the controlling apparatus 100 transmits a menu request packet 240 like one shown in FIG. 6 through the light emitting part 101.

Figure 6:
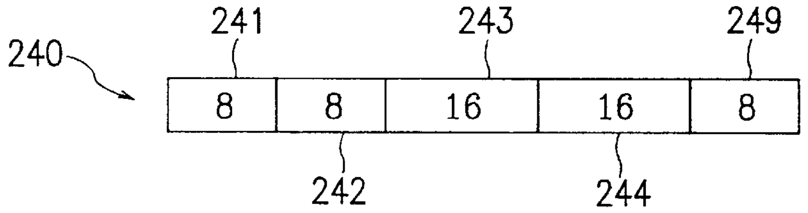
FIG. 6 is a view showing a menu request packet transmitted to the controlled apparatus from the controlling apparatus according to the present invention.

FIG. 6 is a view showing the menu request packet transmitted to the controlled apparatus from the controlling apparatus according to the present invention. As showing in FIG. 6, the menu request packet 240 is constructed by a command code 241 meaning the packet's nature, a packet length 242, an ID 243 of the controlling apparatus, an ID 244 of the controlled apparatuses, and an error detecting code 249. The control object selected once is maintained as a default control object till a new control object is selected by pressing the device button 104 later on. The plural controlled apparatuses 120, 130 and 140 receive all of the packets 240 like as showing in FIG. 6, transmitted from the controlling apparatus 100. After that, the controlled apparatuses 120, 130 and 140 compare and confirm whether the controlled apparatus ID of the received packet is same as oneself ID. If not same as oneself ID, the received packet is disregarded, and if same as oneself ID, the menu selective in a state of present oneself system is transmitted to the controlling apparatus 100 side.

If the controlled apparatus is TV and supposing the present power source is turned off, there will be only the power source to be turned on in the menu selective by the user. But if the present state is turning-on in the power source and if it is a state in the midst of watching TV, the menu selective by the user is to turn off the power source, to change a channel, to control a volume, to remove sound or to adjust a screen, etc. In order to explain more in detail, it is supposed that the present controlled system is the above second state. At this time, the controlled apparatus transmits the packet like as showing in FIG. 7 to the controlling apparatus.

Figure 7:
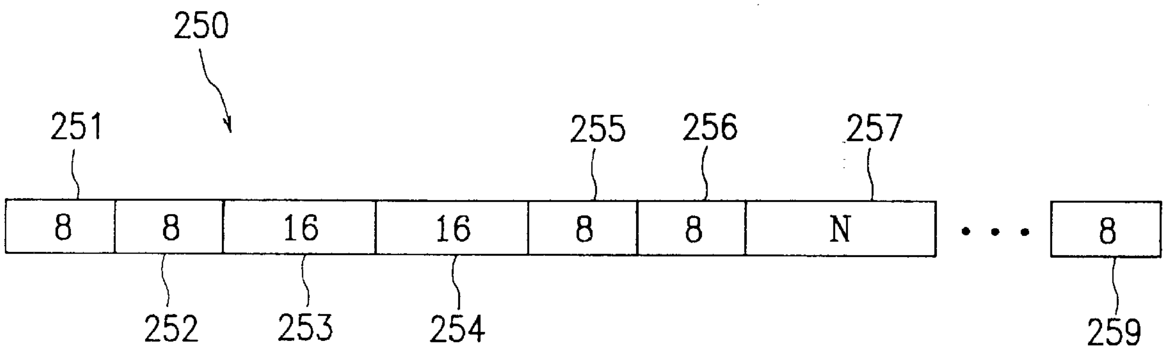
FIG. 7 is a view showing a menu response packet transmitted to the controlling apparatus from the controlled apparatus selected according to the present invention.

FIG. 7 is a view showing a menu response packet transmitted to the controlling apparatus from the controlled apparatus selected according to the present invention. As showing in FIG. 7, the menu response packet 250 is constructed by a response code 251 meaning the packet's nature, a packet length 252, a controlling apparatus ID 253, a controlled apparatus ID 254, a menu number 255 consecutive after this, a series of menu ID 256, a menu name 257, and an error detecting code 259. For example, suppose that, if the menu ID and menu name are 1, they are a volume up, if 2, it is a volume down, if 3, it is a channel up, if 4, it is a channel down, if 5, it is a sound muting, if 6, it is an other function, and if 7, it is a power off. When the controlling apparatus 100 receives the menu response packet 250 like as showing in FIG. 7, it compares with the controlled apparatus ID 254 and judges whether it is the data from the controlled apparatus it oneself requests in FIG. 6. If it is the data from other controlled apparatus, the received packet is disregarded. If the received packet is the packet 250 from the controlled apparatus it oneself requests the menu, this packet is processed and displayed on the display 103 of the controlling apparatus as showing in FIG. 8.

Figure 8:
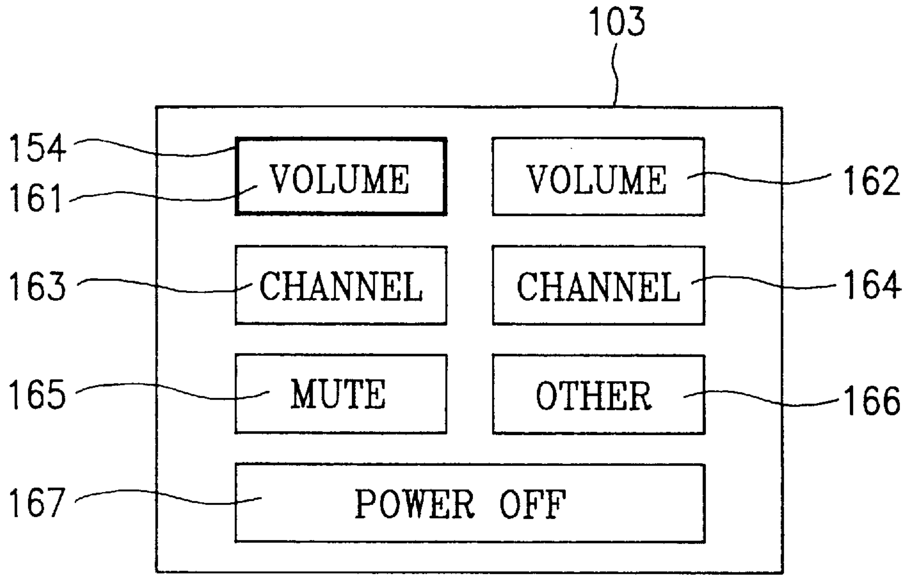
FIG. 8 is a view showing a menu for a control object function displayed on the display of the controlling apparatus according to the present invention.

On the display 103, the menus 161, 162, 163, 164, 165, 166 and 167 selective by the user are arrayed horizontally and vertically as showing in FIG. 8, and the default menu is displayed being emphasized. In FIG. 8, the "volume up" is being selected as the default presently. The user confirms the menu displayed on the display 103, operates the direction key 105 of the controlling apparatus operating part in order to select the menu the user oneself wants to, and moves the cursor 154 indication to the wanted menu. If the user wants to lower TV channel, he moves the cursor 154 to the channel by pressing a lower key and a right key in the menu displayed on the above and presses the execution button 107. When the execution button 107 is pressed, the controlling apparatus 100 transmits the packet 260 of FIG. 9 to the controlled apparatuses 120, 130 and 140.

Figure 9:
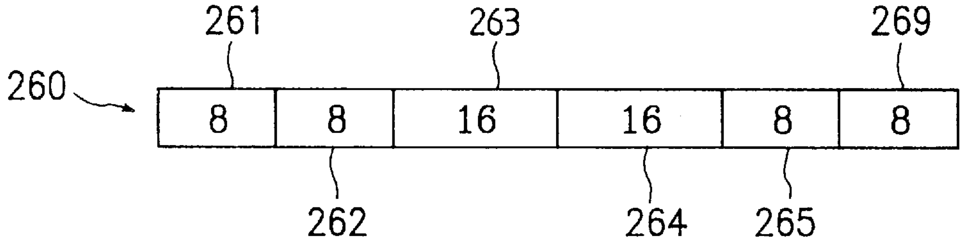
FIG. 9 is a view showing a menu execution request packet transmitted to the controlled apparatus from the controlling apparatus according to the present invention.

FIG. 9 is a view showing a menu execution request packet transmitted to the controlled apparatus from the controlling apparatus according to the present invention. As showing in FIG. 9, the execution request packet 260 is constructed by a command code 261 meaning the packet's nature, a packet length 262, a controlling apparatus ID 263, a controlled apparatus ID 264, a selected menu ID 265 and an error detecting code 269. When the controlled apparatuses 120, 130 and 140 receive the packet 260 of FIG. 9, the controlled apparatuses confirm the controlling apparatus ID 263 and the controlled apparatus ID 264 and judge whether it is the suitable data transmitted to it oneself. In case it is not the data as the object for it oneself, it is disregarded. In case it is the data it oneself should receive, a state of the controlled system is changed in a controlled part 134, a packet 270 which indicates that it oneself receives the data and finishes the process, and which is shown in FIG. 10, is transmitted to the controlling apparatus 100.

Figure 10:
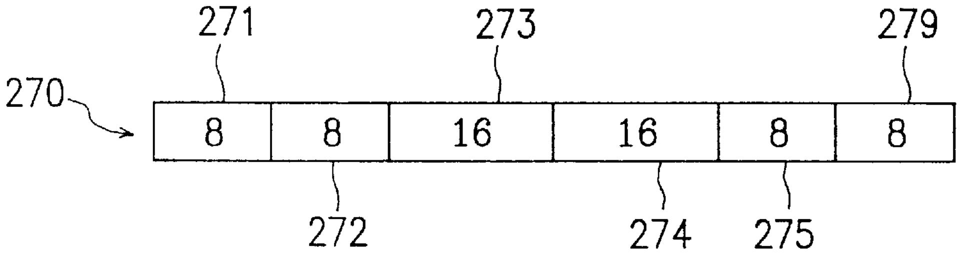
FIG. 10 is a view showing a menu execution response packet transmitted to the controlling apparatus from the controlled apparatus according to the present invention.

FIG. 10 is a view showing a menu execution response packet transmitted to the controlling apparatus from the controlled apparatus according to the present invention. As showing in FIG. 10, the execution response packet 270 is constructed by a response code 271 meaning a response's nature, a packet length 272, a controlling apparatus ID 273, a controlled apparatus ID 274, an executed menu ID 275 and an error detecting code 279. Later in order to execute the menu of the same contents, it is no need to repeat the afore-mentioned steps, and if the user only presses the direction key button 105 of the operating part and the execution button 107, the menu of "volume up", "volume down", "channel up", "channel down", "sound muting" and "power off" etc. can be used.

Figure 11:
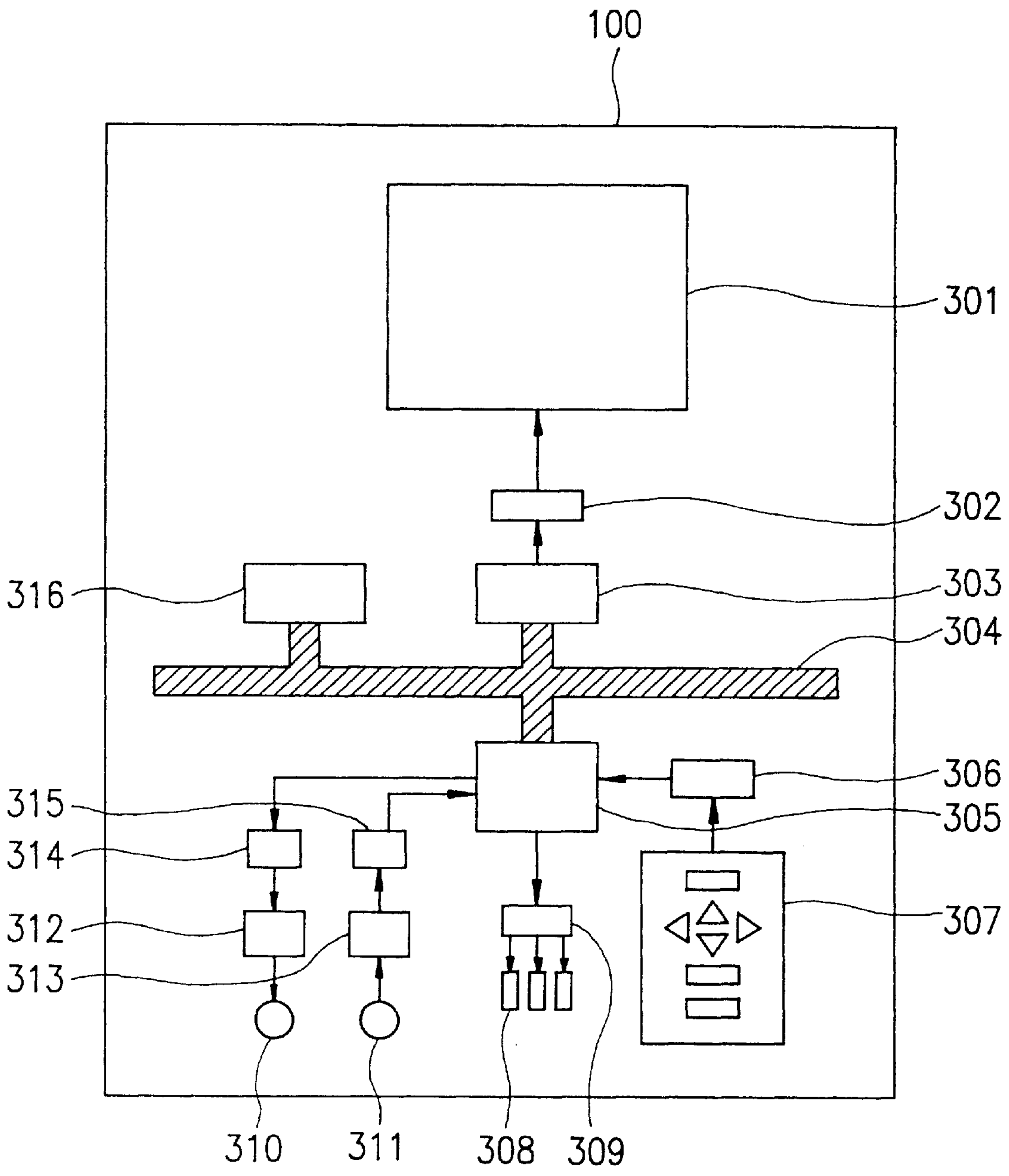
FIG. 11 is a detailed block diagram of the controlling apparatus according to the present invention.

FIG. 11 is a detailed block diagram of the controlling apparatus 100 according to the present invention. As showing in FIG. 11, the controlling apparatus 100 of the present invention includes: a processor 305 for controlling function of whole constructed elements; a key pad 307 for receiving the user's command; a key pad controller 306 for receiving an input from the key pad 307 and transmitting it to the processor 305; a display 301 for displaying the menu so that the user can confirm; a frame buffer 303 having a screen data to be displayed on the display 301; a display controller 302 for reading the data of the frame buffer and displaying it on the display 301; a transmitter 310 for transmitting an infrared data to the controlled apparatuses 120, 130 and 140; a transmitting buffer 314 for keeping the data to be transmitted; a D/A converter 312 for processing the data of the transmitting buffer 314 and transmitting it to the transmitter 310; a receiver 311 for receiving the infrared data from the controlled apparatuses 120, 130 and 140; a receiving buffer 315 for keeping the received data; an A/D converter 313 for processing the received data and for writing and putting it in the receiving buffer 315; an LED 308 for displaying the state of controlling apparatus 100 for the user; an LED controller 309 for controlling the LED; and a memory 316 for storing the state of the controlling apparatus 100 and an administration data.

The following describes the process steps for transmitting the data to the controlled apparatus according to the user's operation in the controlling apparatus 100 with the abovementioned construction, according to a flow of the data. When the user presses the corresponding key of the key pad 307, the key pad controller 306 detects the press of the key and transmits it to the processor 305. The processor 305 analyzes this data through a proper process on the basis of the data stored in the memory 316, generates the packet to be transmitted to the controlled apparatuses 120, 130 and 140, and puts writing it in the transmitting buffer 314. This data passes through the D/A converter 312 and is transmitted through the transmitter 310. The controlling apparatus 100 receives the data transmitted from the controlled apparatuses 120, 130 and 140 and processes it. Such steps are described as follow on the basis of the data flow.

The data transmitted from the controlled apparatus is inputted through the receiver 311 and is kept in the receiving buffer 315 through the A/D converter 313. The processor 305 grasps the meaning of the received data and records the data to be kept in the memory 316. If the received data is the contents to be displayed to the user, the processor 305 converts it into the graphic data and records it in the frame buffer 303. The display controller 302 displays periodically it on the display 301 on the basis of the screen data of the frame buffer 303. At this time, according to a necessity in case the state of the controlling apparatus should be displayed to the user, it is outputted to the LED 308 through the LED controller 309.

Figure 12:
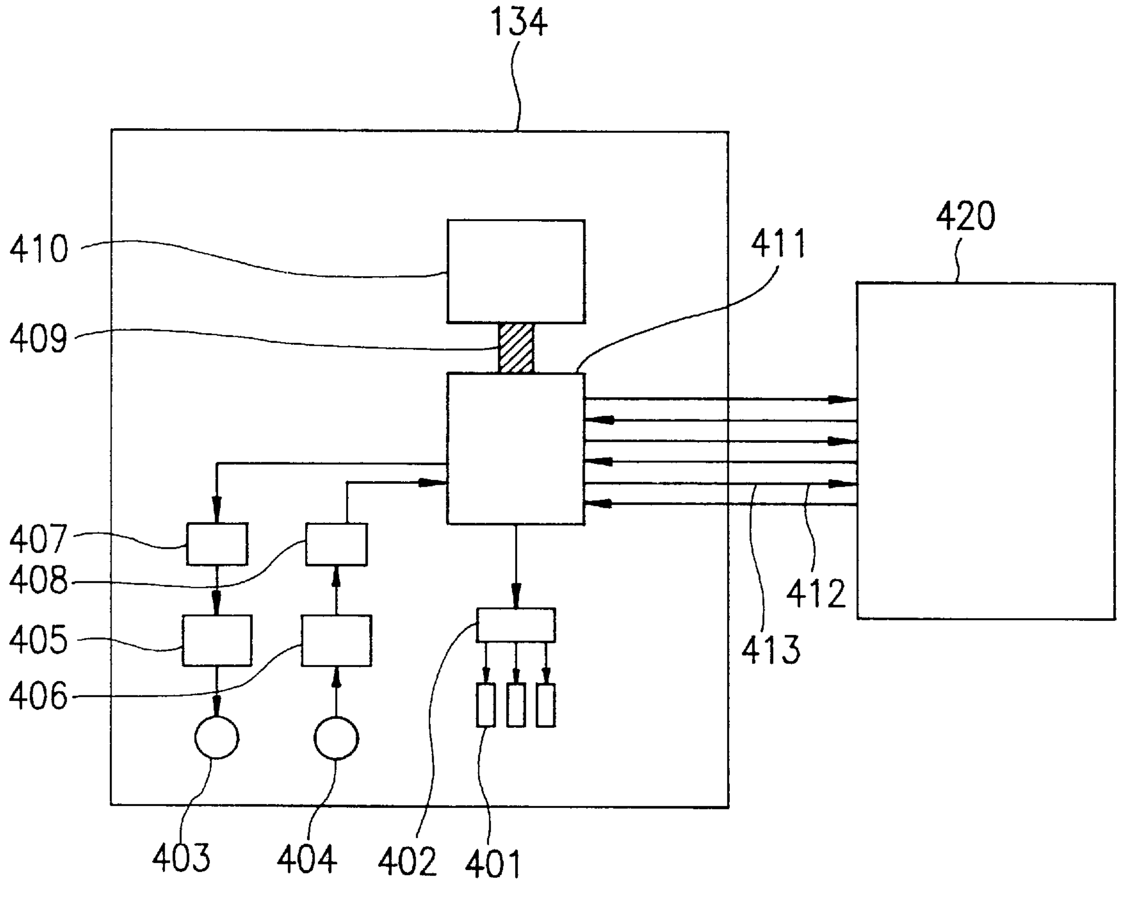
FIG. 12 is a detailed block diagram of the controlled part of the controlled apparatus according to the present invention.

FIG. 12 is a detailed block diagram for the controlled part of the controlled apparatus according to the present invention. As showing in FIG. 12, the controlled part 134 of the controlled apparatus includes: a processor 441 for controlling whole function; a transmitter 403 for transmitting the infrared data to the controlling apparatus 100; a transmitting buffer 407 for keeping temporarily the data to be transmitted; a D/A converter 405 for processing the data of the transmitting buffer 407 and transmitting it to the transmitter 403; a receiver 404 for receiving the infrared data from the controlling apparatus 100; a receiving buffer 408 for keeping the received data; an A/D converter 406 for processing the received data and for writing and putting it in the receiving buffer 408; an LED 401 for displaying the state of controlled apparatus for the user; an LED controller 402 for controlling the LED; and a memory 410 for storing the state of the controlling apparatus 100 and the administration data. The above controlled apparatuses 120, 130 and 140 receive the data transmitted from the controlling apparatus 100 and process it. Such steps are described as follow on the basis of the data flow.

The data transmitted from the controlling apparatus 100 is inputted through the receiver 404 and is kept in the receiving buffer 408 through the A/D converter 406. The processor 411 grasps the meaning of the received data and processes it, and simultaneously records the data to be kept in the memory 410. In the received data in case the state of the controlled apparatuses 120, 130 and 140 should be displayed on the LED 401 according to the necessity, the processor 411 controls the LED 401 through the LED controller 402. If the received data contents is one which the state of the controlled apparatuses 120, 130 and 140 should be changed, the control data is transmitted to the controlled object 420 through a control signal 412. If the command transmitted from the controlling apparatus 100 is to request the state of the controlled apparatuses 120, 130 and 140, the state of the controlled object 420 is grasped through a feedback signal 413 or the packet is constructed on the basis of the data of the memory 410, thereby it is written in the transmitting buffer 407. After that, the data of the transmitting buffer 407 is transmitted through the D/A converter 405 and the transmitter 403.

In accordance with the remote control method and system therefor, of the present invention as abovementioned, numerous controlled apparatuses are controlled in the remoteness by using one controlling apparatus in an integration and easily even without the programming separately.

What is claimed is:

1. A remote control method for controlling a plurality of apparatuses to be controlled by using a single controller by providing wireless, bi-directional transmission of control data between the controller and said apparatuses to be controlled, said method comprising the steps of:

(a) said controller transmitting a register request packet to said apparatus to be controlled so that a user can determine a presence of said apparatuses to be controlled;

(b) receiving, at each of said apparatuses to be controlled, said register request packet and transmitting therefrom a register response packet to said controller, said register response packet including information concerning said apparatuses to be controlled;

(c) transmitting, from said controller, an additional register request packet to said apparatuses to be controlled so that apparatuses to be controlled which is/are not yet registered can be registered;

(d) displaying, by said controller, all apparatuses determined to be controlled in menu lists, and transmitting a menu request packet to an apparatus chosen by the user among the determined apparatuses;

(e) receiving, at each of said apparatuses to be controlled, said menu request packet, comparing an ID of said chosen apparatus in said received menu request packet and an ID of said apparatus to be controlled, ignoring said menu request packet when said IDs are not the same, and transmitting a menu response packet including menus available in the present state to the controller when said IDs are the same;

(f) receiving, at said controller, said menu response packet, comparing an ID of an apparatus to be controlled in said menu response packet and an ID of said chosen apparatus, ignoring said menu response packet when said IDs are not same, displaying menus available to a user by processing said menu response packet when said IDs are the same, and transmitting an execution request packet to said apparatus to be controlled when the user chooses an execution from the menus; and (g) receiving, at each of said apparatuses to be controlled, said execution request packet, checking IDs of said controller and an apparatus to be controlled in said execution request packet, ignoring said execution request packet when it is found that said execution request packet is not for said apparatus to be controlled, updating a status of said apparatus to be controlled when it is found that said execution request packet is for said apparatus to be controlled, and transmitting an execution response packet to the controller, said execution response packet indicating that said apparatus to be controlled has received said execution request packet and completed processing.

2. The remote control method as claimed in claim 1, wherein said register request packet includes a command code, a packet length, an ID of a controller and an error detecting code for transmission data, said command code indicating a type of packet.

3. The remote control method as claimed in claim 1, wherein said step (b) includes each of said apparatuses to be controlled visually informing a user that each of said apparatuses to be controlled is receiving said register request packet when each of said apparatuses to be controlled receives said register request packet.

4. The remote control method as claimed in claim 1, wherein said register response packet includes a response code a packet length, an ID of controller which is expected to receive a response, an ID of an apparatus to be controlled, a name of said apparatus to be controlled and an error detecting code, said response code indicating a type of packet, said name of said apparatus to be controlled being displayed in characters.

5. The remote control method as claimed in claim 1, wherein said additional register request packet includes a command code, a packet length, an ID of a controller, the number and series of IDs of exempted apparatuses to be controlled and an error detecting code, said command code indicating a type of packet, thereby preventing apparatuses to be controlled which is/are already found and not required to respond again, from responding.

6. The remote control method as claimed in claim 1, wherein said menu request packet includes a command code, a packet length, an ID of a controller, an ID of an apparatus to be controlled and an error detecting code, said command code indicating a type of packet.

7. The remote control method as claimed in claim 1, wherein said menu response packet includes a response code, a packet length, an ID of a controller, an ID of an apparatus to be controlled, the number of consecutive menus, a series of IDs and names of said menus and an error detecting code, said response code indicating a type of packet.

8. The remote control method as claimed in claim 1, wherein said execution request packet includes a command code, a packet length, an ID of a controller, an ID of an apparatus to be controlled, an ID of a chosen menu and an error detecting code, said command code indicating a type of packet.

9. The remote control method as claimed in claim 1, wherein said menu execution response packet includes a response code, a packet length, an ID of a controller, an ID of an apparatus to be controlled, an ID of an executed menu and an error detected code, said response code indicating a type of packet.

* * * * *